United States Patent [19]

Rendon

[11] Patent Number: 5,416,476
[45] Date of Patent: May 16, 1995

[54] METHOD AND SYSTEM FOR DETECTING POTENTIAL ICY CONDITIONS ON ROADS

[76] Inventor: Edward Rendon, 3407 NE. 52nd St., Vancouver, Wash. 98661

[21] Appl. No.: 800,204

[22] Filed: Nov. 29, 1991

[51] Int. Cl.⁶ ............................................... B60Q 1/00
[52] U.S. Cl. ................................. 340/905; 340/580;
340/581; 340/583; 340/584; 340/901; 340/904
[58] Field of Search ............... 340/901, 904, 905, 580, 340/581, 583, 584

[56] References Cited

U.S. PATENT DOCUMENTS

| | | | |
|---|---|---|---|
| 3,201,750 | 8/1965 | Morin | 340/901 |
| 3,540,025 | 11/1970 | Levin et al. | 340/583 |
| 3,891,979 | 6/1975 | Braun et al. | 340/581 |
| 4,274,091 | 6/1981 | Decker | 340/583 |
| 4,492,952 | 1/1985 | Miller | 340/901 |
| 4,634,294 | 1/1987 | Christol et al. | 340/584 |
| 4,782,331 | 11/1988 | Martens | 340/583 |

FOREIGN PATENT DOCUMENTS 0971652  7/1975  Canada .......................... 340/580

Primary Examiner—John K. Peng
Assistant Examiner—Edward Lefkowitz
Attorney, Agent, or Firm—Olson & Olson

[57] ABSTRACT

A warning system for vehicles detects actual road surface temperature and advises the driver of surface temperatures which indicate the vehicle may be approaching possible ice formation on roadways. The warning system comprises an infrared detector mounted externally on the vehicle and aimed at the road surface, the detector arranged to read only the infrared temperature wavelength emissions associated with concrete and asphalt to eliminate confusing and erroneous readings inadvertently received through infrared emission from other objects in the vicinity. The detector is connected to a processing unit which translates the electric signals from the detector into a temperature readout display for the driver and the processing unit may include an alarm which is activated to attract the driver's attention when road temperatures are detected that are below a set minimum temperature that is selected by the driver's manual adjustment of a temperature select control knob on the unit.

6 Claims, 1 Drawing Sheet

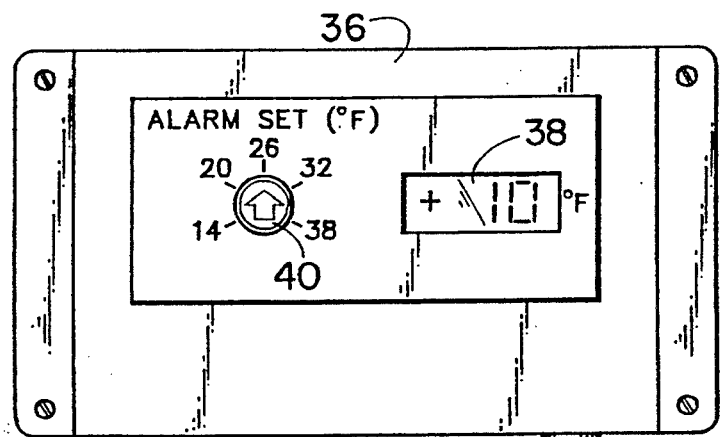
FIG. 4
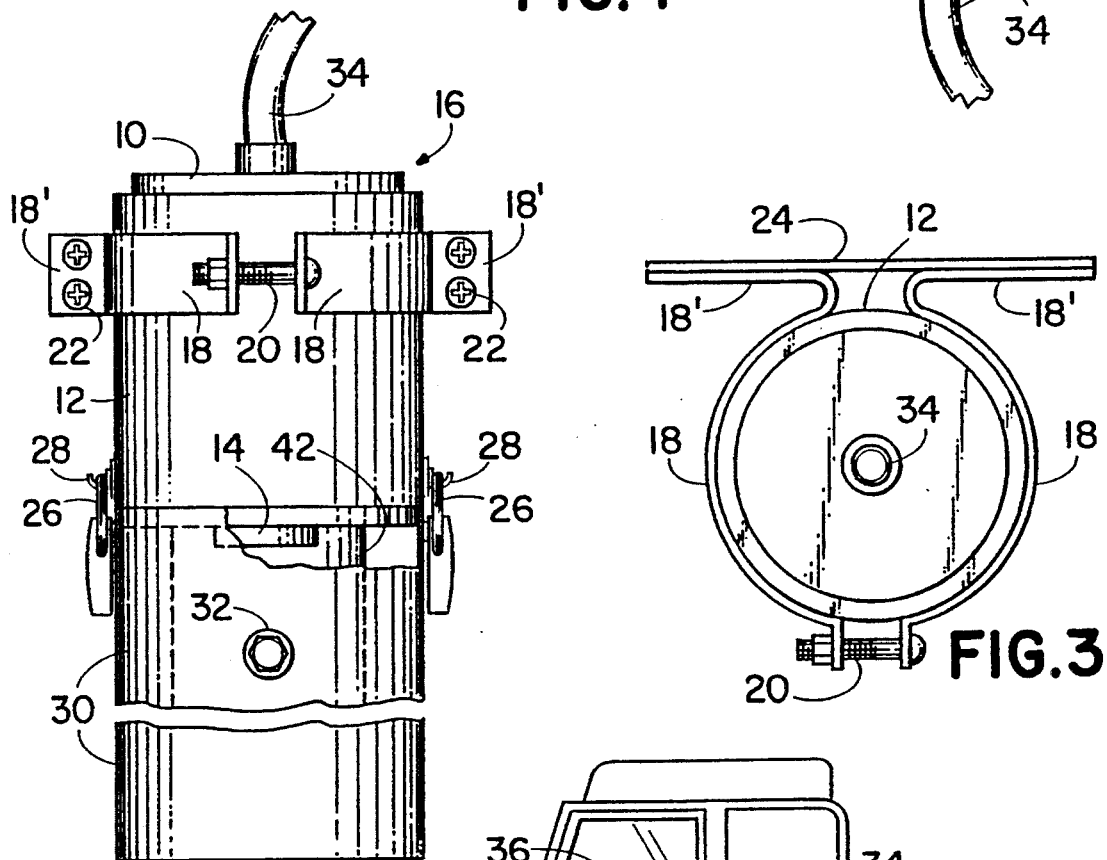
FIG. 2
FIG. 3
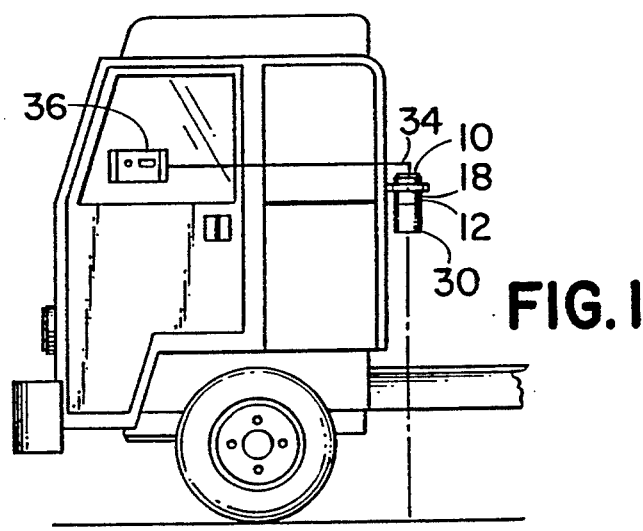
FIG. 1

METHOD AND SYSTEM FOR DETECTING POTENTIAL ICY CONDITIONS ON ROADS

BACKGROUND OF THE INVENTION

This invention relates to warning systems for vehicles to advise the operator of road icing conditions that may exist, and more particularly to a warning system which uses an infrared detector to determine the temperature specifically of the road surface itself, to advise of road conditions which promote the formation of hazardous ice conditions including black ice on roadways.

Ice warning systems heretofore known in the art have involved the use of basic temperature sensors arranged to inform the operator of a vehicle of the ambient temperature, so that the operator will know when freezing air temperatures are occurring. However, because of so many variables, such as winds, heat stored in the earth, differing road surfaces, road heating from vehicle traffic, etc., air temperature is a very unreliable indicator of actual icing conditions existing on roadway surfaces. Black ice may exist in air temperatures above 32° F. (0° C.), and conversely, wet road conditions may be present at air temperatures below freezing. Moreover, the strikingly different road surface conditions may even alternate from one to the other along a road despite the air temperature remaining relatively constant as the vehicle travels.

Thus, a reliance on air temperature not only does not give an accurate indication of actual driving conditions, it can, and in fact often does give one a dangerously false sense of security in the existing road conditions.

No system heretofore has been available which is arranged specifically to read the temperature of the road surface itself, as a vehicle is traveling, to give an accurate accounting of the condition of the road surface irrespective of the air temperature in the surrounding vicinity.

SUMMARY OF THE INVENTION

In its basic concept, this invention provides a vehicle-mounted road surface temperature detection and warning system which uses an infrared detector aimed at the road to detect infrared temperature radiation in the range specifically associated with asphalt and concrete, and report the temperature radiation of the particular road surface to the driver of the vehicle on an ongoing monitoring basis.

It is by virtue of the foregoing basic concept that the principal object of this invention is achieved; namely, the provision of a warning system which can give motorists a reliable and accurate accounting of the actual temperatures of a roadway surface while they are traveling so that they can be aware of conditions which indicate that they are approaching road conditions which promote the formation of ice, while there is still time available to them to prepare for the potentially hazardous driving condition.

Another object of this invention is the provision of a warning system of the class described which may include an alarm feature to visibly and/or audibly warn the driver when road surface temperatures fall below a preselected temperature.

Another object of this invention is the provision of a warning system of the class described which provides a detector housing that is arranged to protect the detector and its ability to operate even under the adverse conditions of vibration, dust, road spray and other factors which limit the sensor's ability to operate satisfactorily under driving conditions.

Another important object of this invention is the provision of a warning system of the class described which advises the operator of road surface temperature as the surface temperature cools to the freezing point of water and also as a below-freezing surface warms to the melting point of ice, so that the particularly hazardous road condition when water and ice are in the transition stage is known.

Still another object of this invention is the provision of a warning system of the class described which utilizes an infrared detector that is calibrated to read infrared wavelengths associated only with conventional road surfaces, thereby reducing the complexity of the electronics normally associated with conventional infrared detectors, while also eliminating the possibility of inadvertently reading temperature radiation from other objects in the vacinity.

A further object of this invention is the provision of a warning system of the class described which is of simplified construction for economical manufacture to place the warning system into a price range that allows its purchase and use by the majority of truckers and other motorists for increased safety of the overall motoring and pedestrian traffic in winter time.

The foregoing and other objects and advantages of this invention will appear from the following detailed description, taken in connection with the accompanying drawings of a preferred embodiment.

BRIEF DESCRIPTION OF THE DRAWINGS

FIG. 1 is a fragmentary schematic side elevation of a truck mounting a warning system embodying the features of this invention, the detector unit mounted in one acceptable position on the vehicle frame and directed at a roadway.

FIG. 2 is a foreshortened, fragmentary side elevation of an infrared detector housed in a protective casing which is configured to mount the detector acceptably on the exterior of a vehicle, the casing including a removable lens shield arranged to protect the lens of the detector against conditions which impair its ability to operate at maximum efficiency.

FIG. 3 is a plan view of the infrared detector of FIG. 2 as viewed from the top in FIG. 2.

FIG. 4 is a fragmentary front elevation of a processing unit which receives the signals from the detector and translates them into information that is usable to the driver.

DESCRIPTION OF THE PREFERRED EMBODIMENT

A road temperature warning system comprises basically, as indicated generally in FIG. 1, an infrared sensing unit positioned externally on the vehicle to detect infrared temperature radiation emanating from the road surface on which the vehicle is traveling, and a remote processing unit mounted in the cab of the vehicle for receiving the signals from the detector and advising the driver of the detected road conditions. These two units are shown separately in FIGS. 2 and 4 respectively.

Referring primarily to the infrared sensing unit itself (FIGS. 1, 2 and 3), the detector comprises a weather sealed infrared detector 10 preferably modified to the extent that it is configured to be contained within a protective mounting casing such as the tubular casing 12, and preferably engineered to detect infrared temperature radiation in only the wavelengths associated primarily with asphalt and concrete. These wavelengths range between 2 and 22 microns. As illustrated, the unit 10 includes a lens 14 through which the detection of infrared temperature radiation is made.

A mounting bracket 16 is configured, in this embodiment, to engage the casing 12 by friction supplied by the mounting bracket members 18 being drawn together about the casing 12 by clamp bolt 20. As illustrated best in FIG. 3, the bracket members 18 are configured, at their ends 18' opposite the clamp bolt 20, to form a mounting surface which is suitable for mounting, as by bolts 22, onto a vehicle in a desired location, such as is shown in FIG. 1. Vibration dampening material, shown as rubber pad 24, is interposed between the mounting surface 18' and the vehicle to reduce vibration transmitted to the detector from the moving vehicle.

Interposed between the detector body 10 and the interior of the casing 12 is preferably provided means to further dampen vibration and shock on the detector otherwise transmitted from the moving vehicle through the mount 16 and the casing 12. A suitable dampening means may comprise cloth, cork or rubber strips (not shown) interposed between the detector 10 and the inner wall the casing 12. It will of course be understood that other conventional dampening means may alternatively be employed as desired to cushion the detector against shock and vibration.

As seen best in FIG. 2, the casing tube 12 mounts lock bails 26 which are configured to releasably engage corresponding lock catches 28 on a separate extension of the tube 12. This extension, hereinafter referred to as a focal tube, extends from approximately the bottom of the detector 10, in the area proximate to the lens 14, downward a distance sufficient to accomplish the particular goals which will become clear later. In experimentation, the preferred length of the focal tube has been found to be approximately 20 cm (8 inches), although longer or shorter tubes may be used satisfactorily in other applications.

With the lock bails 26 released and the focal tube 30 removed, the lens 14 is exposed for easy cleaning and inspection. With the tube 30 locked in place, the lens is shielded and hence protected from the wind, flying objects, road spray, dirt and dust. With the lens thus disposed a distance away from the open end of the focal tube, the air rushing past the end of the tube as the vehicle travels creates a venturi effect which tends to draw dust laden air downward from the tube and away from the lens, further enhancing the ongoing cleaning and maintenance of the lens. If the assembly is mounted on the vehicle so that the tube 30 is angled very slightly toward the rear, the venturi effect is increased without adversely affecting the reading ability of the detector itself. Also, the tube 30 confines the detector lens reception angle onto only a narrow area of the road surface, for more accurate surface temperature readings.

Additionally, as illustrated, the tube 30 may include, if desired, a hose fitting 32 disposed near the lens 14, the fitting being capable of being connected to a source of air under pressure supplied by the vehicle. The air thus injected into the interior of the tube constantly washes across the lens and increases air movement through the tube and out of its open bottom end. In the manner, dust laden air is prevented from entering the tube, and any minute particles of dust, etc. is washed away from the lens 14. Accordingly, the interior of the tube 30, as well as the lens 14, is protected against dust accumulation even under very difficult conditions such as driving on dirt roads, slow vehicle traffic, and stopping at traffic signals and the like when dirt and dust is most prevalent.

When the warning system is not to be used for extended periods of time, as in the warmer months, a protective lens cap (not shown) may be placed over the lens or over the open end of the tube 30, or if so configured, may include lock catches 28 which may be engaged by lock bails 26 on the casing 12, thus replacing the tube 30. In this way, the lens is carefully protected and the focal tube may be stored in a safe place in order to protect it from the possibility of damage while the system is not needed or being used for extended periods of time.

As shown in FIGS. 1, 2 and 4, an electrical cable 34 extends from the detector 10 into the interior of the vehicle to a processing unit 36 (FIG. 4) which is mounted in the driver's area. The electrical cable carries the electric signal generated by the detector to a signal amplifier and other circuitry in the processing unit where the signal is transformed into a signal that is recognizable to the driver. This signal may be displayed as a digital temperature display 38 of the ongoing road surface temperature as it is read, or the signal may be displayed as a light or audible alarm that is activated whenever the sensed temperature of the road surface falls below or rises to a certain specified temperature. The temperature at which the warning signal is activated may be selected by adjusting a conventional sensitivity control such as the temperature alarm select knob 40 illustrated.

For simplicity of manufacture and the resulting cost advantage obtained by the simplified construction, the detector preferably uses circuitry which detects infrared wavelength only in the range 2–20 microns, which is the range specifically associated with the radiation emitted by asphalt and concrete. Thus, the detector does not include the complex and expensive electronics normally associated with conventional detectors which allow them to read temperature radiation emitted from all objects, since only concrete and asphalt are of any importance in this particular application. Additionally, this simplified construction also eliminates confused or misleading readings received from other objects on the road or in near proximity thereto.

In use, the warning system of this invention may be mounted on a vehicle such as is shown in FIG. 1, with the detector 10 pointed downwardly directly at a road surface and the processing unit 36 mounted inside the vehicle in the view of the driver. The lens 14 is directed at the road surface, and the tube 30 surrounds and protects the lens from direct exposure to the elements associated with winter time driving. Vibration is dampened as has been discussed earlier.

As is known, all objects continuously emit infrared temperature radiation at different wavelengths, depending on the temperature and composition of the particular object being studied. Thus, the concrete or asphalt roadway is also emitting infrared radiation continuously, and, as the detector passes over the road surface, this infrared temperature radiation is being read continuously as the vehicle proceeds.

The signals sent to the processing unit 36 are translated into information which the processing unit displays, as by LCD readout 38, as road temperature in degrees Fahrenheit or Celsius. When temperatures are detected that show the road surface to be lowering toward or rising to a particular temperature, (the freezing/melting point) as determined by adjusting the sensitivity knob 40, a separate signal, either visual or audible, may be activated to immediately attract the driver's attention to the situation.

When the road surface approaches freezing, as in the case of black ice, a steady decrease in surface temperature will be detected as the vehicle nears the frozen section. Thus, as the driver sees the temperature of the road surface drop, he becomes aware that a potentially icy condition will exist ahead of him if the weather conditions are also such that the formation of ice is possible.

At a predetermined road temperature, such as 34°–36° F., an alarm may automatically be triggered to inform the driver that the road temperature has dropped to a level where he now needs to be particularly watchful of further road cooling, while there is still time to prepare before entering the unsafe condition.

As will be apparent to those skilled in the art, while the warning system of this invention is not concerned with the temperature of the air or the changes that occur in air temperature, I R detectors of this type are distracted by temperature changes. Therefore, the system does typically react to the ambient temperature and includes an internal ambient air temperature sensor and circuitry which detects the air temperature that the I R detector is subjected to and automatically recalibrates the detector accordingly, to compensate for temperature differences and its effect on the actual operation of the detector and its accuracy of readings.

A driver seeing that trees and sign posts are forming ice on them might be concerned that ice could be forming on the road surface as well, but after miles of driving without experiencing any freezing road surface, be lulled into a false sense of security and relax his vigilance, even as the road surface might be cooling to freezing. However, in this system, when the actual road surface temperature is such that icing becomes possible, or when surface temperature warms such that melting is possible, the driver is informed so that he may act accordingly.

In order for the detector to perform as accurately as possible, it is necessary that the lens 14 of the unit remain as clean as possible, which is difficult to ensure in an exterior mounted unit, particularly under winter time driving conditions. The function of the protective focal tube 30 is thus seen as being a structural feature which is quite important to the proper performance of this system.

However, occasionally it is desirable to clean and inspect the detector lens, and hence its removability is quite important to facilitating this operation. Accordingly, the case 12 surrounding the detector includes the means described for releasably mounting the tube 30 for its quick and easy removal and reattachment. Other suitable mounting arrangements may of course be alternatively employed, the lock bails 26 and clasps 28 shown being illustrative of one suitable form.

It will be apparent to those skilled in the art that the infrared detector of this invention may be mounted on other locations of a vehicle, as long as the lens is aimed at the road surface and it is afforded an unobstructed view thereof. Although such locations as on the roof, adjacent the windshield, on the bumper, and mirror mount are contemplated as being acceptable, the position shown affords the greatest protection from the elements and potential obstructions to view of the road surface.

It will also be understood by those skilled in the art that the detector system of this invention will also find important utility when the lense 14 comprises a conventional telephoto or zoom lense arrangement 42 to focus accurately on road surfaces from a distance, as when the detector is mounted on a helicopter or other aircraft. It has been determined that this arrangement is desired because it allows an aircraft to fly over roads to determine where present and potential hazzards are so that sanding or salting equipment can be directed more quickly and efficiently, and with less wasted material. Other advantages of road surface temperature detection from aircraft by this invention are also easily recognized.

From the foregoing it will be apparent to those skilled in the art that various changes, other than those already discussed, may be made in the size, shape, type, number and arrangement of parts described hereinbefore without departing from the spirit of this invention and the scope of the appended claims.

Having thus described my invention and the manner in which it may be used, I claim:

1. A warning system for detecting potentially icy road surface conditions from vehicles, the warning system comprising:
   a) an infrared detector configured for mounting on a vehicle to detect infrared temperature radiation emitted by conventional road surface and to produce electric signals representing detected temperatures, and
   b) a processing unit mounted in the vehicle and including electric temperature indicating means connected to said infrared detector to receive the electric signals from the infrared detector to inform an operator of the vehicle of road temperatures that indicate potential icing conditions.

2. The warning system of claim 1 wherein the processing unit temperature indicating means includes an audible or visual alarm when the road surface temperature detected falls below a predetermined temperature minimum.

3. The warning system of claim 1 wherein the processing unit temperature indicating means includes a numerical display of degrees of temperature detected from a road surface, and an audible or visual alarm which is triggered when the detected road surface temperature falls below a predetermined temperature minimum.

4. The warning system of claim 1 wherein the infrared detector includes a casing and a lens at the forward end of the casing, and a detector lens-protecting hollow, open-ended tube is detachably secured to the forward end of the casing and is configured to surround the lens of the detector and extend outwardly therefrom a distance sufficient to protect the lens from exposure to dust, dirt, road spray and other deleterious elements associated with the driving environment.

5. The warning system of claim 1 wherein the infrared detector mounts a lens arrangement configured to focus accurately from a distance equivalent to that required for temperature readings to be taken of a runway road surface from an airplane on a landing approach, whereby a pilot may be apprised of potential freezing surface conditions in advance of a commitment to land.

6. A method of detecting potentially icy road conditions from a moving vehicle comprising detecting the infrared temperature radiation emitted from a road surface and signaling an operator when the detected road surface temperature approaches the temperature at which water freezes or ice melts.

* * * * *